United States Patent [19]

Thoma

[11] Patent Number: 4,498,335

[45] Date of Patent: Feb. 12, 1985

[54] CONTROL ARRANGEMENT FOR A GEAR TESTING MACHINE

[75] Inventor: Peter Thoma, Zurich, Switzerland

[73] Assignee: Maag Gear-Wheel & Machine Company Limited, Zurich, Switzerland

[21] Appl. No.: 436,519

[22] Filed: Oct. 25, 1982

[30] Foreign Application Priority Data

Nov. 9, 1981 [CH] Switzerland ................... 7162/81

[51] Int. Cl.³ .................... G01B 7/28; G01M 13/02
[52] U.S. Cl. ............................ 73/162; 33/179.5 R
[58] Field of Search ............... 73/162; 33/179.5 R, 33/179.5 A, 179.5 D

[56] References Cited

U.S. PATENT DOCUMENTS

| | | | |
|---|---|---|---|
| 3,530,712 | 9/1970 | Matteucci | 73/162 |
| 3,712,130 | 1/1973 | Weichbrodt | 73/162 |
| 4,182,045 | 1/1980 | Busch | 33/179.5 R |
| 4,252,023 | 2/1981 | Pomernack | 73/162 |
| 4,322,889 | 4/1982 | Guenter | 33/179.5 R |

*Primary Examiner*—Steven L. Stephan
*Assistant Examiner*—Denis E. Corr
*Attorney, Agent, or Firm*—Werner W. Kleeman

[57] ABSTRACT

The control arrangement enables, with the aid of a start-up control device which is connected with an oscillation or vibration pickup or transducer which is affixed to the generating cylinder of the machine, running-up of the measuring drive at an optimum acceleration to the final or end measuring velocity, so that already at the start of the measuring operation there are obtained valid measurement results, in other words measurment results which are not impaired by the natural oscillations or vibrations of the machine, without there having to be relinquished at the machine the advantageous presence of a lever system and generating straight edge, and thus, the positive motion transmission between the slide system and the test gear. The optimum acceleration, i.e., the slope or ascent of the start-up curve of the measuring drive is determined by the start-up control device as the product of the reciprocal value of the set torque or rotational moment of an auxiliary drive motor and the reciprocal value of the envelope amplitude of the vibration signal delivered by the oscillation or vibration pickup.

5 Claims, 7 Drawing Figures

CONTROL ARRANGEMENT FOR A GEAR TESTING MACHINE

BACKGROUND OF THE INVENTION

The present invention relates to a new and improved construction of a control arrangement for a gear testing machine.

Generally speaking, the control arrangement for a gear testing machine of the present development is of the type comprising a slide or carriage system supporting a measuring feeler and possessing a measuring drive which can be regulated by a velocity regulator. A lever system which is actuated by the slide system serves for moving a generating straight edge upon which rolls free of slip a generating cylinder. This generating cylinder is coupled with the test gear and is provided with an auxiliary drive which can be set or adjusted to a substantially constant torque or rotational moment. There is also provided a final or end measuring velocity setting or adjustment device which delivers the set or reference value for the velocity regulator as well as there being provided a torque or rotational moment setting device for the auxiliary drive.

A state-of-the-art gear testing machine for which there has been provided such control arrangement has been illustrated in FIG. 1, based upon which there initially will be briefly explained the measuring principles of such a gear testing machine or gear tester.

During the profile testing of gears the generating slide or carriage 10 is shifted by an infinitely variable or regulatable profile measuring drive motor 12. By means of the lever system 14 there is thus moved the generating straight edge 16 which is mounted upon ball or spherical guides. A generating cylinder 18 rolls free of slip upon such generating straight edge 16 or equivalent structure. This rotational movement is transmitted by means of a magnetic coupling to a workpiece spindle 20. After the operator has set the base circle diameter at the machine, the lever system 14 is positively altered by the feed or advance slide 22 in such a manner that the produced relative movement between the feeler or probe 24 and the test gear 26 always exactly corresponds to the generating or rolling motion which results due to rolling of the test gear upon its tooth base circle. The relative movement between the feeler 24 and the tooth flank of the test gear 26 therefore exactly corresponds to an involute which coincides with the base circle of the test gear. When the tooth profile deviates from the exact involute shape, then the feeler 24 is correspondingly deflected. The deflection of the feeler 24 is indicated by a not particularly illustrated recording device and is recorded or plotted in accordance with the selected magnification scale.

During testing of the tooth direction the cam disk 28 or the like is rotated by an amount corresponding to the base helix angle, and the vertical slide or carriage 30 is moved by a helix measuring drive motor 32, whereas the generating slide 10 is stationary. Due to the inclined position of the cam disk 28 there is shifted the helix slide or carriage 34, with the result that the lever system 14 again moves the generating straight edge 16 and the test gear 26 is rotated. By virtue of the rotation of the test gear 26 and the vertical movement of the feeler 24 there results a relative movement in the form of a helix or screw line, the pitch of which, related to the base circle cylinder of the test gear, exactly corresponds to the set helix angle. Hence, the feeler 24 moves up and down along a flank line. Each deviation of the tooth flank from the theoretical helix or screw line causes a deflection of the feeler which is indicated by the recording device and is plotted or otherwise registered in accordance with the selected magnification scale.

It has been found that with such gear testing machines or gear testers the required testing accuracy only is attainable for gears up to a diameter of 1.60 meters and up to a weight of about 6 tons. In the case of gears having a larger diameter and a greater weight the entire measuring system becomes so sensitive to vibrations or oscillations that it is no longer possible to accomplish accurate measurements, especially during the starting phase of the measurements performed at each tooth flank. The inertia of the test gear is then so great that during the force transmission from the slide system by means of the lever system and the generating straight edge to the test gear, in order to place such into rotation, there are excited at the machine natural vibrations or oscillations which so falsify the measurement result that such is not usable. With the previously described prior art gear testing machine there is provided an auxiliary drive 36, the rotational moment of which can be set or adjusted, in a manner to be described more fully hereinafter, in such a fashion that, among other things, it compensates for all bearing friction at the region of the workpiece spindle 20. However, during each measuring operation which begins anew at each tooth flank, there arise oscillations or vibrations when testing very large gears, because of the inadequate stiffness or rigidity of the arrangement composed of the lever system and the generating straight edge, which vibrations could not heretofore be avoided with any of the known gear testing machines. The curve 2 in FIG. 2 illustrates such oscillations or vibrations at the beginning of the measuring operation when performing a measurement in a direction from the base or root to the head or tip of the tooth flank. It will be seen that the start-up vibration phenomenon at the beginning of the curve amounts to practically one-tenth of the total measurement; this means that the measurement is practically rendered unusable by virtue of this start-up vibration phenomenon.

In order to circumvent the problem of the oscillation or vibration-sensitivity there has become known to the art from U.S. Pat. No. 3,741,659, granted June 26, 1973, a gear testing machine wherein, instead of the arrangement composed of the lever system and the generating straight edge for rotating the test gear by a rolling or generating motion, there are provided purely electronic means, i.e., there is used an independent drive for the rotational movement of the test gear and for the linear movement of the slide or carriage along with the feeler. The motors provided for the individual movements always operate independently of one another and are mutually synchronized by means of tachogenerators. However, in practice it has been found that the mutual movement coordination requires extremely accurate measuring value transmitters and an expenditure in electronic components which is not economically feasible.

Additionally, there is known to the art a gear testing machine from German Pat. No. 2,747,863, granted April 30, 1981, which generally corresponds to the broad description of gear testing machine of this development heretofore recited at the outset of this disclosure, inasmuch as there is likewise present the mechanical arrangement between the slide system and the test gear. Further, there is provided for the slide or carriage system and the generating cylinder a respective independent or separate drive motor. What is however different is that between the slide system and the generating straight edge of the mechanical transmission train there is arranged a displacement path pickup which detects the relative movements between the slide and the generating straight edge. The output of the displacement path pickup or transducer is connected, on the one hand, with a follow-up regulation device for the drive motor of the measuring slide and, on the other hand, is connected by means of a difference forming device with the feeler. In this case the drive for the test gear does not constitute any auxiliary drive, rather is a primary or main drive which places the test gear into rotation, instead of accomplishing a generating or rolling operation between the generating straight edge and the generating cylinder. Also with this prior art machine oscillation or vibration problems arise during the testing of large gears, in particular always during start-up of the measuring operation at each tooth flank. Additionally, a gear testing machine, where there is provided the usual slide system, the lever system with the generating straight edge and the auxiliary drive for the test gear, is not readily capable of being retrofitted to operate in accordance with the principles of this prior art machine.

The aforementioned oscillations or vibrations—herein sometimes simply referred to as vibrations—which arise during start-up of the measuring drive can be, of course, avoided in the case of gears where the tooth flanks possess a relief, because it is at that location where the start-up operation of the measuring drive occurs, while the feeler or probe is still located at the region of the relief, in other words not at the active tooth flank, and thus, the actual measurement first begins after the start-up vibrations have already ceased. However, most gears do not possess any such type of relief. Additionally, the aforementioned start-up vibrations or oscillations also can be avoided if the measuring drive is started-up over random long time periods. However, that is not a practical solution, because there is demanded of a gear testing machine a certain measuring capacity or efficiency which presupposes that for the measurement of each tooth flank there is not employed more time than is absolutely necessary. It is therefore necessary that valid measurement results are available as quickly as possible already during the start-up of the measuring drive, i.e., during its run-up to the final or end measuring velocity.

SUMMARY OF THE INVENTION

Therefore, with the foregoing in mind it is a primary object of the present invention to provide a new and improved construction of control arrangement for a gear testing machine which is not associated with the aforementioned drawbacks and limitations heretofore discussed.

Another and more specific object of the present invention is directed to a new and improved construction of a control arrangement of the character described which is designed such that already beginning with the start of the measuring operation there are available valid measuring results, in other words, measuring results which are not falsified by the natural vibrations of the machine, without there having to be dispensed with at the machine the use of the advantageous presence of a lever system and generating straight edge, and thus, the positive motion transmission between the slide system and the test gear.

Still a further significant object of the present invention is directed to a new and improved construction of a control arrangement for a gear testing machine which is relatively simple in construction and design, quite economical to manufacture, extremely reliable in operation, and not readily subject to breakdown or malfunction.

Now in order to implement these and still further objects of the invention, which will become more readily apparent as the description proceeds, the control arrangement for a gear testing machine according to the present development is manifested by the features that, there is provided a vibration pickup or transducer which is fixedly connected with the machine and delivers a vibration or oscillation signal—herein sometimes simply referred to as a vibration signal—, and there also is provided a start-up control device which is arranged between the end or final measuring velocity setting device and the velocity regulator. This start-up or starting control device is connected with the output of the vibration pickup and with the torque or rotational moment setting device. This start-up control device allows the measuring velocity to ascend as a function of time to the set or reference value such that the slope is equal to the product of the reciprocal value of the set auxiliary drive rotational moment or torque and the reciprocal value of the amplitude of the envelope of the vibration signal.

The start-up control device contained in the control arrangement of the present invention maintains the slope of the characteristic, which is representative of the timewise dependency of the measuring velocity until attaining the final or end measuring velocity, at such a value that the final measuring velocity is reached in as short a time as possible, without there arising during start-up vibrations which would falsify the measuring or measurement result. The start-up control device can be readily incorporated into the already present control arrangement of the gear testing machine. For this purpose it is only necessary to disconnect the existing connection between the final measuring velocity setting device and the velocity regulator and to connect such with the start-up control device, and at a suitable location of the machine there is mounted a vibration pickup or transducer. The rotational moment of the auxiliary drive, which previously was determined based upon a manual measurement of the tooth flank in that the measuring operation initially is accomplished a number of times from the root to the tip and then from the tip to the root of the tooth flank, and thus, was varied such that the measuring curves obtained during a measuring operation in both directions were congruent, is inputted into the start-up control device and then the reciprocal value of the thus determined rotational moment during the start-up operation is multiplied by the reciprocal value of the envelope amplitude of the vibration signal delivered by the vibration pickup or transducer, with the result that the start-up control sets an optimum slope for the start-up curve.

According to a further feature of the invention, the start-up or starting control device contains a signal preparation circuit which is connected with the output of the vibration pickup or transducer. This signal preparation circuit serves to determine the reciprocal value of the amplitude of the envelope of the vibration signal. Also, such start-up control device contains a controllable amplifier coupled with the torque or rotational moment setting device and the signal preparation circuit and serves to form the product of the reciprocal value of the set auxiliary drive torque or rotational moment and the reciprocal value of the amplitude of the envelope of the vibration signal. This start-up control device further contains a controllable integrator which is coupled with the final measuring velocity setting device and with the output of the controllable amplifier. This controllable integrator delivers the output signal of the start-up control device to the velocity regulator. With this design of start-up control device there can be used extremely simple electronic means.

In accordance with a further feature of the invention there is provided a device which is connected with the signal preparation circuit and serves to set a minimum envelope amplitude constituting an interrupt or break-off criterion for adjusting the slope during the start-up control operation. This minimum envelope amplitude of the vibration signal of the vibration pickup or transducer is selected such that there is interrupted the effect upon the slope of the start-up curve. There is chosen a value for the minimum envelope amplitude at which the feeler no longer displays any deflection.

According to a further feature of the invention the vibration pickup or transducer can be secured to the generating cylinder. With this design of the equipment the vibration pickup is provided at a location of the machine where there occurs the transmission of the measuring velocity to the rotational movement of the test gear. This placement site of the vibration pickup is particularly advantageous since the same is directly coupled with the point which is to be measured. The vibration pickup could be, of course, also affixed at the lever system or at the generating straight edge, but in that case there would then arise greater signal amplitudes. The vibration frequency of the machine which is detected by the vibration pickup or transducer is in the order of normally between 2 to 14 Hz.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
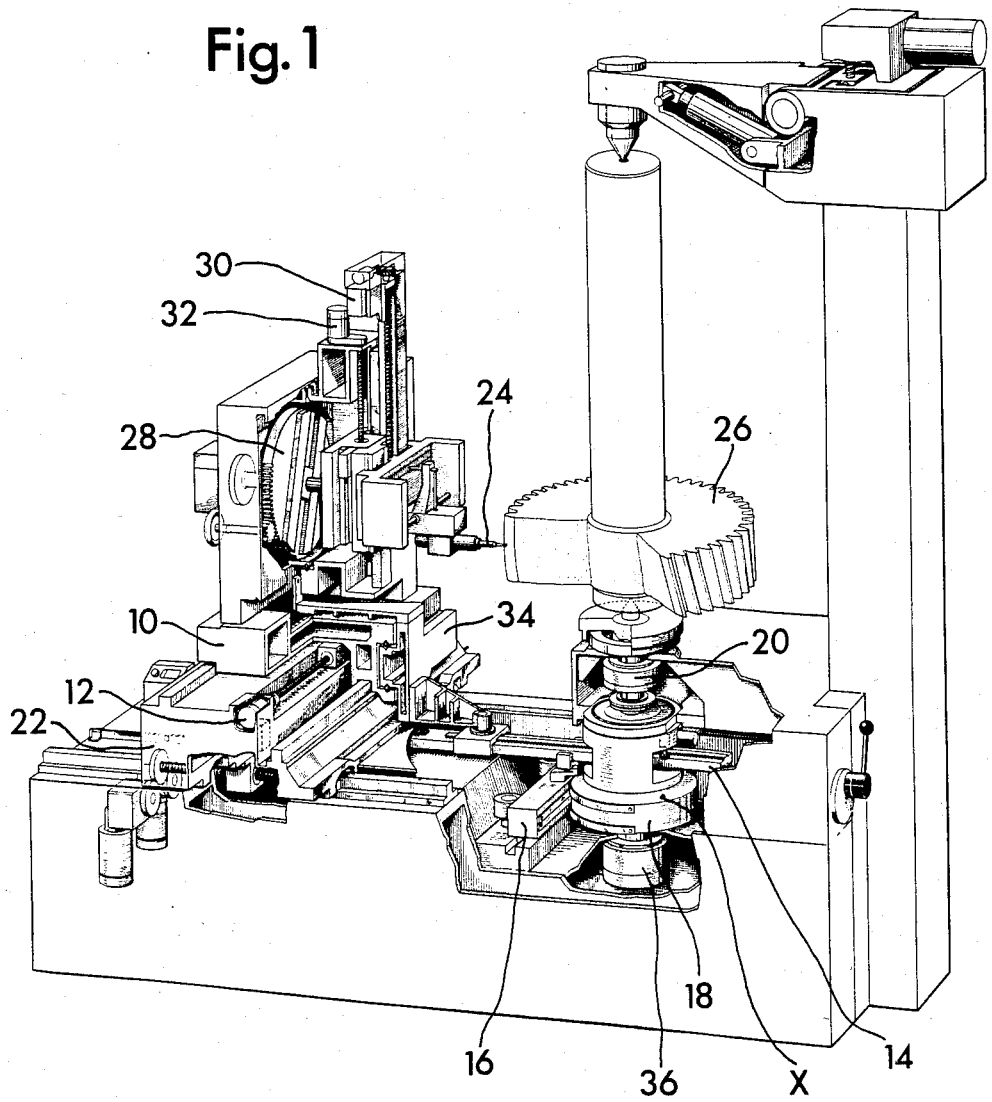
FIG. 1 is an exemplary embodiment of a gear testing machine or gear tester equipped with a control arrangement constructed according to the present invention.

Describing now the drawings, in FIG. 1 there has been illustrated a prior art gear testing machine, the mode of operation of which has already been described in detail at the outset of this disclosure. In this machine there is provided at the location X at the generating cylinder 18 a vibration pickup or transducer 50 which has been schematically illustrated simply in the form of a block in FIG. 5. As to such vibration pickup 50 such is, for instance, constituted by a commerically known type of acceleration transmitter, for instance available from Sundstrand Corporation, under their commercial designation QA 1100.

Figure 5:
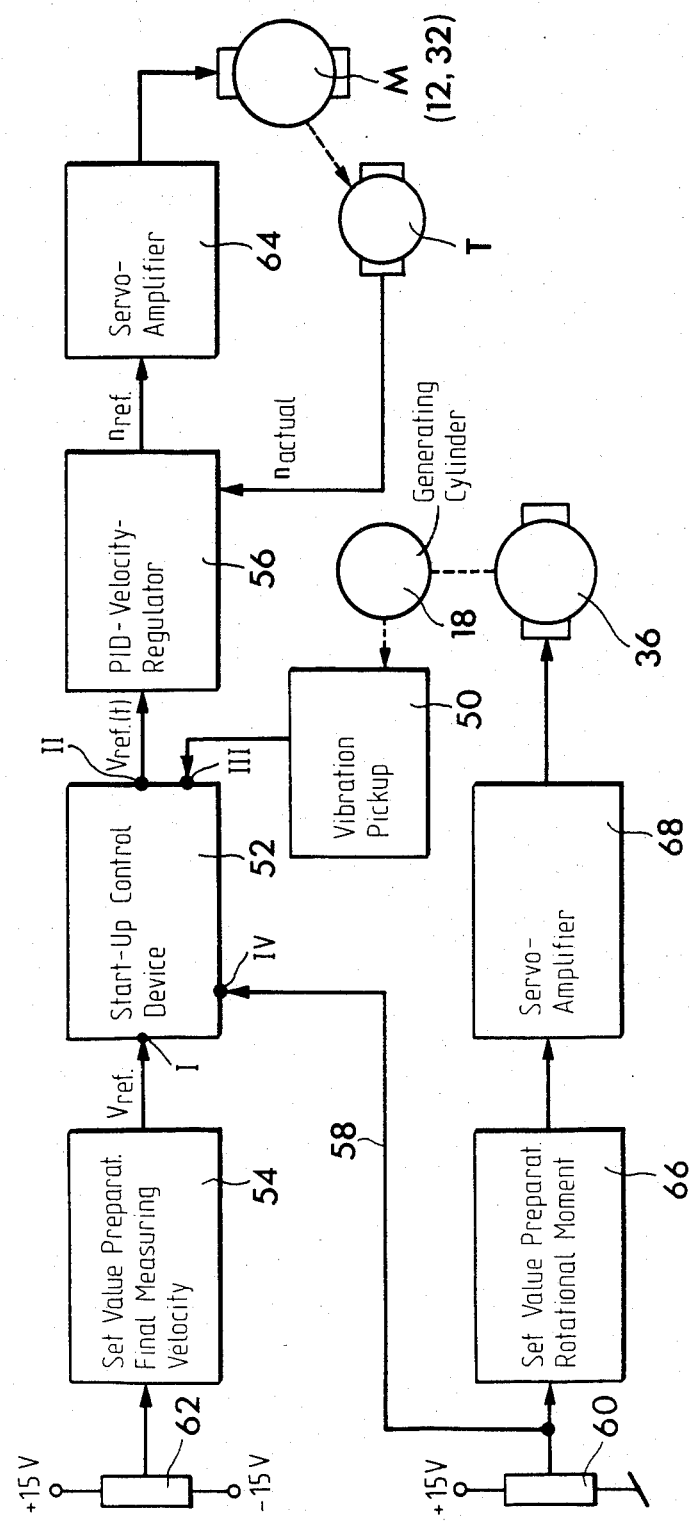
FIG. 5 is a block circuit diagram of the control arrangement constructed according to the invention.

The usual control arrangement of this gear testing machine possesses the construction depicted in FIG. 5, with the exception of the start-up or starting control device 52 and the vibration pickup 50. Instead of this start-up control device 52 there is usually provided a direct connection between the final measuring velocity-set value preparation circuit 54 and the PID-velocity regulator 56 (three-terms controller) and no connection line 58 between the tap of a potentiometer 60 provided as a torque or rotational moment-setting device for the auxiliary drive. In the control arrangement which possesses the conventional design a potentiometer 62, serving as the final measuring velocity setting or adjustment device, delivers a predetermined end or final measuring velocity which must be empirically set at the machine, i.e., in accordance with experience, as a function of the size and weight of the gear to be tested or test gear 26. The signal delivered by the potentiometer 62 is converted by the set value-preparation circuit 54 into a state which is compatible with the velocity regulator 56. Its output signal, which constitutes a rotational speed-reference or set value $n_{ref}$ is applied by means of a servo-amplifier 64 to a measuring drive motor or measuring drive M which may be constituted by the profile measuring drive motor 12 or the helix measuring drive motor 32 of the arrangement of FIG. 1. This rotational speed is sensed by a tachogenerator T and is applied as an actual value-rotational speed signal $n_{actual}$ to the velocity regulator 56.

The potentiometer 60 is manually set to a rotational moment or torque-set value. This set or reference value is converted by a rotational moment or torque-set value preparation circuit 66 into a state which is compatible with the auxiliary drive or drive motor 36 and is applied by means of a servo-amplifier 68 to the auxiliary drive motor 36. As already previously explained, this auxiliary drive motor 36 serves the purpose of producing an essentially constant rotational moment or torque which just compensates the bearing friction and the break-away moment at the region of the workpiece spindle 20 and the test gear 26. The auxiliary drive motor 36, as should be expressly understood, does not serve the purpose of driving the test gear 26 during the measuring operation, rather only serves to just compensate the frictional forces which are caused thereby, so that such need not be also applied by the measuring drive M by means of the lever system 14 and the generating straight edge 16. In the case of gears having a weight of several tons the lever system 14 and the generating straight edge 16 would not be stiff enough in order to maintain a power flow or connection between the measuring drive M and the gear 26. As previously explained, the appropriate set or adjustment value for the rotational moment or torque is determined in that there are accomplished at a tooth flank two measurements, i.e. from the root or base to the tip and from the tip to the root, and this operation is repeated, while changing the set value, for such length of time until both measuring curves are brought into coincidence, and thus, there is present the optimum rotational moment of the auxiliary drive 36 which just eliminates the frictional forces.

Figure 2:
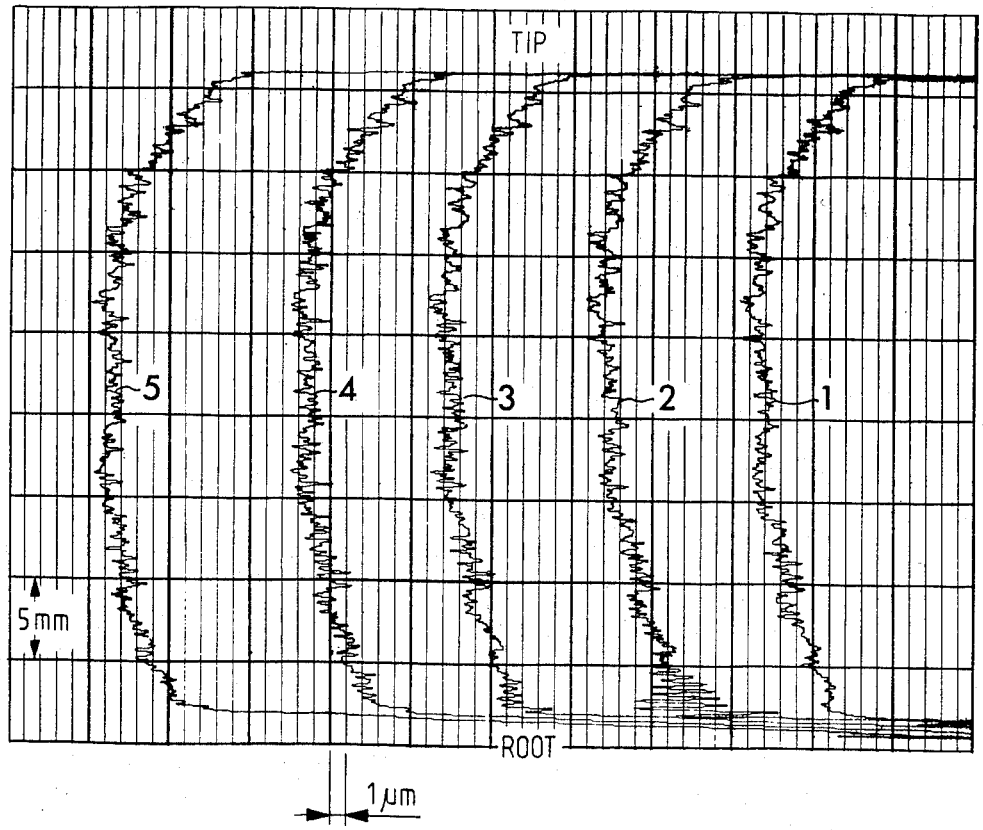
FIG. 2 illustrates measuring curves of a series of measuring tests.

Regarding such measuring operation such involves a normal measurement, by means of which, for instance, there is obtained a measuring curve as such has been designated in FIG. 2 by reference numeral 1. The servo-amplifier 68 then drives the auxiliary drive motor 36 with a constant current corresponding to the determined rotational moment-set or reference value. In practice it has been found that, if there is used a control arrangement of the type depicted in FIG. 5, without the start-up control device 52 and the vibration pickup 50 according to the invention, then there are produced at the start of the measurement at the active flank of the test gear 26 vibrations which render the measuring or measurement result unusable, and as such has been indicated in FIG. 2 by the curve 2. Since, as is known, the base circle radius of the test gear 26, the weight thereof and the varying friction of the machine are incorporated into the setting of the rotational moment or torque of the auxiliary drive 36, these parameters are compensated by measuring a tooth flank and the described bringing into congruency or coincidence of two measuring curves obtained at the same tooth flank by the then set rotational moment of the auxiliary drive 36. However, this procedure does not enable eliminating the aforementioned vibrations at the start of the measuring operation in the case of large gears. Yet, these parameters which are implicitly contained in the set rotational moment of the auxiliary drive 36 can be used in the manner to be described hereinafter, by suitably linking thereof with the vibration signal delivered by a vibration pickup or transducer 50, so that the measuring drive M can be run-up to the final or end measuring velocity in a manner wherein there are not produced any vibrations caused by virtue of the insufficient stiffness or rigidity of the mechanical system between the measuring drive M and the test gear 26.

According to the showing of FIG. 5, there is provided the starting or start-up control device 52 which is connected with the vibration pickup or transducer 50 in order to avoid the start-up vibrations. The input I of this start-up control device 52 is connected with the output of the set value-preparation circuit 54, the input IV of such start-up control device 52 is connected with the tap of the potentiometer 60, the input III with the output of the vibration pickup or transducer 50, and the output II is connected with the velocity regulator 56. Before describing in detail the construction of the start-up control device 52 there will be, however, considered more closely the measuring or test series which resulted in the measuring curves portrayed in FIG. 2.

The measurements were accomplished at a test gear weighing 12 tons under the following conditions:

| Measuring series Profile HA 6.8 2000-fold 2Hz 2:1 | | | |
| --- | --- | --- | --- |
| Measurement | V | T | Comments |
| 1 | 2.2 | — | comparison diagram |
| 2 | 2.2 | 1s | at the beginning contacting of active flank |
| 3 | 2.2 | 3s | at the beginning contacting of active flank |
| 4 | 2.2 | 5s | at the beginning contacting of active flank |
| 5 | 2.2 | 8s | at the beginning contacting of active flank |

In the foregoing Table the following designations mean:
HA 6.8 = the position of the auxiliary drive (0 ... 10)
2000-fold = increase of the feeler signal
2 Hz = recording device filter (not shown)

During the measurement 1 the time T until reaching the end or final measuring velocity was selected to be so great that, with certainty, no vibrations could arise during the start-up or starting operation. The curve 1 therefore can serve as a comparison diagram. Such a great deal of time is not available in practice, because for reasons of economy a certain measuring capacity or efficiency must be obtained, which presupposes a predetermined maximum measuring time which should not be exceeded.

Figure 3:
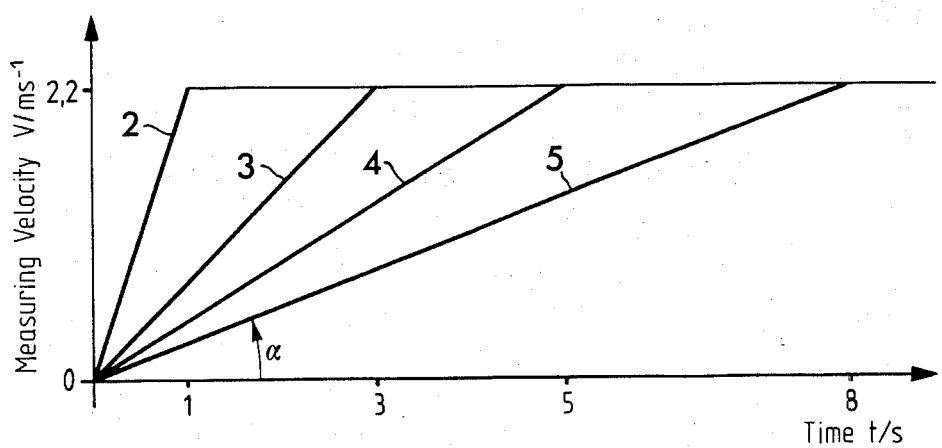
FIG. 3 is a diagram in which there have been plotted the measuring velocity as a function of time for different curves with linear slope or ascent of the measuring velocity to the final or end measuring velocity.
Figure 4:
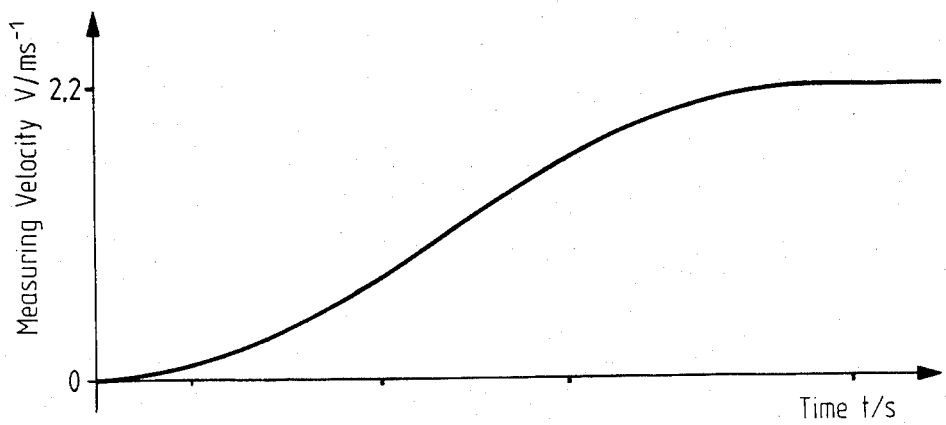
FIG. 4 is a S-shaped ascending curve which can be used in place of the linear ascent curves of FIG. 3.

The ascent of the measuring velocity to the final measuring velocity, and which has been determined by the start-up control device 52, can be accomplished in a linear fashion, as shown in FIG. 3, or in a S-shaped configuration, as shown in FIG. 4. It has been found that in both cases there do not arise any measurable differences, and it is for this reason that there will be simply described in detail hereinafter only the linear ascending curves of FIG. 3.

Curves of the type depicted in FIG. 3 were used during the measurements, the results of which have been indicated in FIG. 2. The curve 2 corresponds to an ascent of the measuring velocity to the final measuring velocity of 2.2 m/s in 1 second. For the measurements 3, 4 and 5 there was used the same end or final measuring velocity which, however, were started-up in each case with a lesser slope or ascent, i.e. in three seconds, five seconds and eight seconds, respectively. The slope α of the curve 2 is too large, i.e., the linear running-up to the final measuring velocity of 2.2 m/s in 1 second was accomplished too rapidly because, as has been shown in the curve 2 of FIG. 2, there were produced at the beginning of the starting or start-up operation vibrations which rendered the measuring result unusable. The curves 3 and 4 which possess an increasingly lesser slope portray a diminishing vibration tendency, and finally, the curve 5 shows a vibration-free course at the start of the measuring operation. In other words, a slope α, which corresponds to a run-up to the final measuring velocity of 2.2 m/s in 8 seconds produces a good measuring result. In the examples illustrated in FIG. 2 in the form of the curves 2 to 5 there was used the start-up control device 52 in conjunction with the vibration pickup 50, however there were manually fixedly inputted certain slopes α for purposes of comparison. Of course, the purpose of the start-up control device 52, which will be described in greater detail hereinafter, is to automatically obtain a measuring or measurement result which in its quality corresponds to the curve 5. For this purpose the vibration pickup or transducer 50 is used. The vibration signal of the vibration pickup or transducer 50 is used in order to bring the slope α of the start-up or starting curve which is representative of the measuring velocity as a function of time, to an optimum value at which there can not arise any vibrations which would falsify the measuring result and nonetheless to be able to run-up to the final or end measuring velocity in the shortest amount of time.

Figure 6:
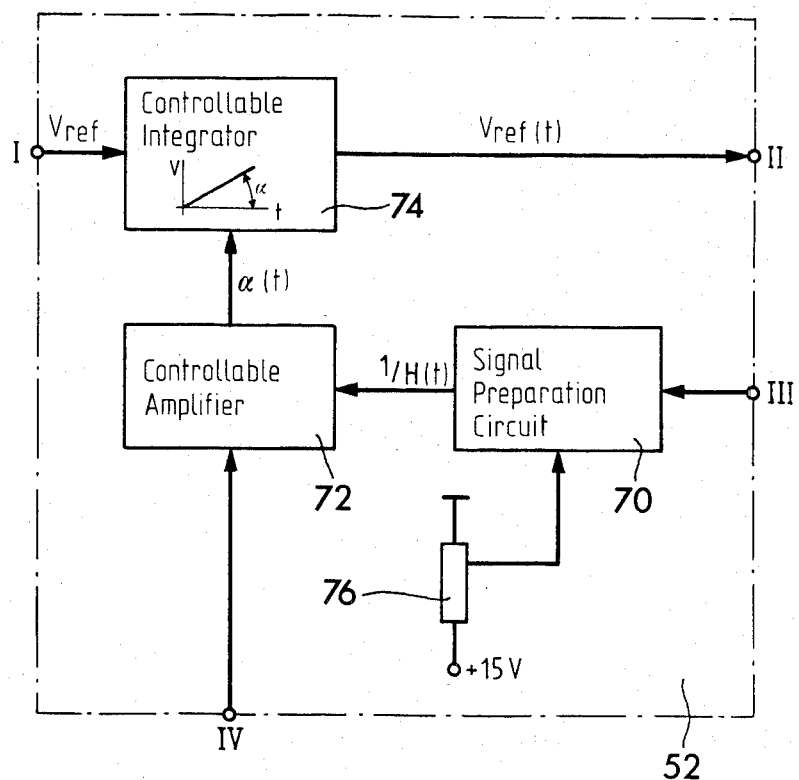
FIG. 6 is a block circuit diagram of the start-up or starting control device provided in the control arrangement of FIG. 5.

As to this start-up control device 52 such has been illustrated in greater detail in FIG. 6. This start-up control device 52 receives by means of its input III a vibration or oscillation signal (FIG. 7) from the vibration pickup or transducer 50. A signal preparation circuit 70 determines the amplitude H of the envelope of the vibration signal and delivers the reciprocal value 1/H to a controllable amplifier 72. This controllable amplifier 72 additionally receives by means of the connection line or conductor 58 and the input IV a signal corresponding to the rotational moment or torque set at the potentiometer 60. The controllable amplifier 52 forms from the reciprocal value of the rotational moment-set value and the reciprocal value 1/H the product and delivers such in the form of a signal which corresponds to the slope $\alpha$ by means of its output to a controllable integrator 74. The controllable integrator 74 receives by means of the input I the set or reference velocity signal $V_{ref}$ and allows the measuring velocity to linearly ascend from null to the final measuring velocity having the slope $\alpha$. The output signal $V_{ref}(t)$ is delivered by means of the output II to the PID-velocity regulator or controller 56. This velocity regulator 56 performs a set value-actual value comparison between the reference or set rotational speed corresponding to the momentary reference or set velocity and the actual rotational speed $m_{actual}$, and delivers a positioning or adjustment signal, corresponding to the difference, by means of the servo-amplifier 64 to the measuring drive motor M which finally correspondingly rotates the measuring gear 26. The signal preparation circuit 70 is additionally connected with the tap of a potentiometer 76. There is set at the potentiometer 76 the interrupt criterion, i.e. a predetermined minimum value of the envelope amplitude H, and thus, a predetermined magnitude of the vibration signal, beginning with which there no longer should be altered the slope $\alpha$ because it has obtained its optimum value. There is selected for the interrupt or break-off criterion a vibration magnitude at which the feeler 24 no longer responds. The vibration pickup 50, which is appreciably more sensitive than the feeler, still delivers vibration signals, however there must be determined a threshold from which these vibration signals no longer can produce any effect at the feeler because the feeler is too insensitive.

Figure 7:
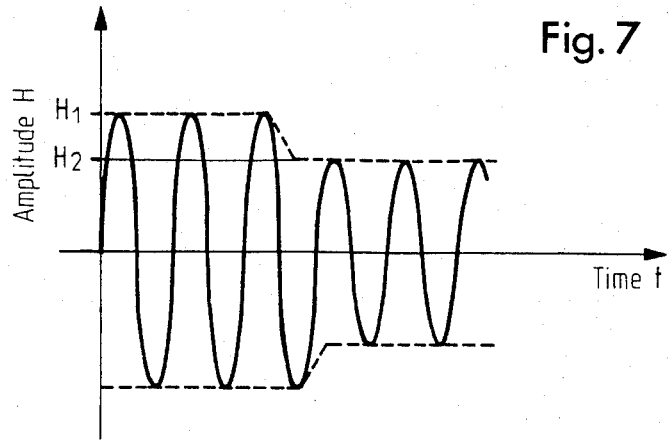
FIG. 7 is a diagram of the vibration or oscillation signal delivered by the vibration pickup or transducer of the arrangement of FIG. 5.

With reference to FIGS. 5, 6 and 7 there will now be described the mode of operation of the control arrangement.

Initially there is set at the potentiometer 62 the final or end measuring velocity, which constitutes an empirical value, which indicates how rapidly a certain gear can be measured at a predetermined gear testing machine. The final measuring velocity $V_{ref}$ is delivered by the reference or set value-preparation circuit 54 to the start-up control device 52 which runs-up the measuring velocity with an optimum slope $\alpha$ (FIG. 3) to the final measuring velocity. The start-up control device 52 therefore, as a practical matter, constitutes a control input transmitter for the PID-velocity regulator 56 which delivers thereto the control input or magnitude during the acceleration phase and after reaching the final measuring velocity causes such to maintain the same constant. The potentiometer 60 is adjusted or set in the previously described manner such that the auxiliary drive motor 36, for the relevant test gear and the relevant machine, just compensates the frictional forces, the base circle radius and the weight of the test gear. For this purpose there is previously undertaken a measurement in accordance with the curve 1 of FIG. 2 in the manner previously described. If there has been set too small a torque or rotational moment for the auxiliary drive or if there were not provided any auxiliary drive at all, then the entire lever system would bend and would not be capable of entraining free of inertia the test gear.

The vibration pickup or transducer 50 delivers a vibration signal, and the signal preparation circuit 70 determines from such vibration signal its envelope amplitude $H_{(t)}$ (FIG. 7) and from the latter the reciprocal value 1/H. The reciprocal value of the rotational moment-set value is multiplied with the reciprocal value 1/H of the vibration signal in the controllable amplifier 72. This results in a certain slope $\alpha_{(t)}$ by means of which there can be controlled the controllable integrator 74 which, in turn, acts upon the velocity regulator 56 in the manner previously described. Considered generally in mathematical terms there can be expressed the following relationship for the slope $\alpha_{(t)}$:

$$\alpha_{(t)} = \frac{1}{\text{auxiliary drive}} \cdot \frac{1}{H_{(t)}}$$

At the start of the measurement the envelope amplitude $H_1$ is large and the reciprocal value $1/H_1$ is correspondingly small. The small reciprocal value $1/H_1$ produces a certain gain in the controllable amplifier 72 and a predetermined value for the slope $\alpha$. After the readjustment of the measuring drive motor M the vibration pickup or transducer 50 delivers a vibration signal having a smaller amplitude $H_2$. By means of the reciprocal value which becomes larger there again is produced a greater slope $\alpha$ and a greater vibration amplitude, so that the measuring drive motor M is readjusted with a velocity corresponding thereto. This procedure is continued until the interrupt criterion has been reached, namely a predetermined minimum value of the amplitude H, and which interrupt criterion has been set as a function of the machine. At this point in time there has been found the optimum value for the slope $\alpha$, which then is no longer changed until there has been initialized a new measuring operation.

While there are shown and described present preferred embodiments of the invention, it is to be distinctly understood that the invention is not limited thereto, but may be otherwise variously embodied and practiced within the scope of the following claims. Accordingly,

What I claim is:

1. A control arrangement for a gear testing machine, comprising:
   a slide system;
   a measuring feeler supported by said slide system;
   a regulatable measuring drive provided for such slide system;
   a velocity regulator for regulating said regulatable measuring drive and having a set value input;
   a final measuring velocity-setting device having an output and generating thereat a final measuring velocity set value for said velocity regulator;
   a generating straight edge;

a lever system for moving said generating straight edge;

said slide system actuating said lever system;

a generating cylinder rolling essentially free of slippage upon such generating straight edge when said generating straight edge is moved under the action of said lever system actuated by said slide system;

said generating cylinder being capable of being coupled with a test gear;

an auxiliary drive provided for said generating cylinder;

said auxiliary drive being settable to a substantially constant rotational moment;

a rotational moment-setting device provided for said auxiliary drive and generating a set signal representative of said substantially constant rotational moment for said auxiliary drive;

a vibration pickup fixedly connected with the gear testing machine and delivering a vibration signal which defines an envelope having an amplitude;

said vibration pickup having an output;

a start-up control device;

said start-up control device having a first input connected to said output of said final measuring velocity-setting device and receiving at said first input thereof said final measuring velocity set value;

said start-up control device having a second input connected to said rotational moment-setting device for said auxiliary drive and receiving at said second input thereof said set signal representative of said substantially constant rotational moment for said auxiliary drive;

said start-up control device having a third input connected to said output of said vibration pickup and receiving at said third input thereof said vibration signal delivered by said vibration pickup; and said start-up control device having an output connected to said set-value input of said velocity regulator for regulating said regulatable measuring drive for said slide system and generating at said output thereof, during a start-up phase of a gear testing operation, a set value of said measuring velocity which set value ascends as a function of time to said final measuring velocity set value according to a slope which equals the product of the reciprocal value of said set signal representative of said substantially constant rotational moment for said auxiliary drive and the reciprocal value of the amplitude of the envelope of said vibration signal.

2. The control arrangement as defined in claim 1, wherein:

said vibration pickup is connected with said generating cylinder.

3. The control arrangement as defined in claim 1, further including:

a rotational moment set value preparation circuit connected on an input side thereof to said rotational moment-setting device and cooperating on an output thereof with said auxiliary drive in order to generate said substantially constant rotational moment at a value just sufficient to compensate frictional forces occurring at said generating cylinder.

4. A control arrangement for a gear testing machine, comprising:

a slide system;

a measuring feeler supported by said slide system;

a regulatable measuring drive provided for such slide system;

a velocity regulator for regulating said regulatable measuring drive;

a generating straight edge;

a lever system for moving said generating straight edge;

said slide system actuating said lever system;

a generating cylinder rolling essentially free of slippage upon such generating straight edge;

said generating cylinder being capable of being coupled with a test gear;

an auxiliary drive provided for said generating cylinder;

said auxiliary drive being settable to a substantially constant rotational moment;

a final measuring velocity-setting device for outputting a set value for the velocity regulator;

a rotational moment-setting device provided for said auxiliary drive;

a vibration pickup fixedly connected with the gear testing machine and delivering a vibration signal;

said vibration pickup having an output;

a start-up control device arranged between said final measuring velocity-setting device and said velocity regulator;

said start-up control device being operatively connected with said rotational moment-setting device;

said start-up control device allowing the measuring velocity to ascend as a function of time to the set value in such a manner that the slope equals the product of the reciprocal value of the set auxiliary drive-rotational moment and the reciprocal value of the amplitude of the envelope of the vibration signal;

said start-up control device comprises:

a signal preparation circuit connected with the output of the vibration pickup;

said signal preparation circuit serving for the determination of the reciprocal value of the amplitude of the envelope of the vibration signal;

a controllable amplifier connected with said rotational moment-setting device and with the signal preparation circuit;

said controllable amplifier serving for forming the product from the reciprocal value of the set auxiliary drive-rotational moment and the reciprocal value of the amplitude of the envelope of the vibration signal;

said controllable amplifier having an output; and a controllable integrator connected with the final measuring velocity-setting device and with the output of the controllable amplifier for delivering an output signal of the start-up control device to the velocity regulator.

5. The control arrangement as defined in claim 4, further including:

means connected with the signal preparation circuit for setting a minimum envelope amplitude as an interrupt criterion for adjusting the slop during the start-up control operation.

* * * * *

UNITED STATES PATENT AND TRADEMARK OFFICE
CERTIFICATE OF CORRECTION

PATENT NO. : 4,498,335

DATED : February 12, 1985

INVENTOR(S) : PETER THOMA

It is certified that error appears in the above-identified patent and that said Letters Patent is hereby corrected as shown below:

In the Abstract, line 9, please delete "measurment" and insert --measurement--

Column 6, line 12, please delete "commerically" insert --commercially--

Column 10, please delete the entire equation and insert $$--\hat{a}_{(t)} = \frac{1}{\text{auxiliary drive}} \cdot \frac{1}{H_{(t)}} --$$

Column 12, line 64, please delete "slop" and insert --slope--

Signed and Sealed this

Thirtieth Day of July 1985

[SEAL]

Attest:

DONALD J. QUIGG

Attesting Officer     Acting Commissioner of Patents and Trademarks